(12) United States Patent
Wong et al.

(10) Patent No.: US 11,030,015 B2
(45) Date of Patent: Jun. 8, 2021

(54) HARDWARE AND SOFTWARE RESOURCE OPTIMIZATION

(71) Applicant: INTERNATIONAL BUSINESS MACHINES CORPORATION, Armonk, NY (US)

(72) Inventors: Kim Poh Wong, Singapore (SG); Yanjun Ma, Mill Park (AU)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 16/576,057

(22) Filed: Sep. 19, 2019

(65) Prior Publication Data
US 2021/0089360 A1 Mar. 25, 2021

(51) Int. Cl.
*G06F 9/46* (2006.01)
*G06F 9/50* (2006.01)
*G06N 5/02* (2006.01)

(52) U.S. Cl.
CPC .......... *G06F 9/5077* (2013.01); *G06F 9/5016* (2013.01); *G06F 9/5044* (2013.01); *G06F 9/5055* (2013.01); *G06N 5/025* (2013.01)

(58) Field of Classification Search
CPC .... G06F 9/5077; G06F 9/5016; G06F 9/5044; G06F 9/5055; G06N 5/025
See application file for complete search history.

(56) References Cited

U.S. PATENT DOCUMENTS

| | | | |
|---|---|---|---|
| 9,838,370 | B2 | 12/2017 | Doering |
| 10,009,292 | B2 | 6/2018 | Dunbar |
| 10,191,778 | B1 | 1/2019 | Yang |
| 2018/0129526 | A1 | 5/2018 | Zheng |
| 2018/0365072 | A1 | 12/2018 | Li |

*Primary Examiner* — Gregory A Kessler
(74) *Attorney, Agent, or Firm* — Schmeiser, Olsen & Watts; Christopher M. Pignato (57) ABSTRACT

A method and system for improving hardware and software resource optimization technology is provided. The method includes retrieving and analyzing operational parameters of hardware and software systems. In response, a probability of impact with respect to modified sizing requirements associated with the hardware and software systems is determined and actions including logical rules mapped to the operational parameters is determined. The actions are executed and an actual impact with respect to executing the modified sizing requirements is determined. In response, operational allocations of the hardware and software systems are modified with respect to operational functionality of the hardware and software systems.

20 Claims, 10 Drawing Sheets

HARDWARE AND SOFTWARE RESOURCE OPTIMIZATION

FIELD

The present invention relates generally to a method for optimizing hardware and software resources and in particular to a method and associated system for improving hardware and software technology associated with analyzing operational parameters of hardware and software systems and modifying operational allocation of the hardware and software systems.

BACKGROUND

Typical system environments allow for little flexibility with respect to sizing requirement functionality. Optimizing resource usage may implement a complicated process that may be time consuming and require a large amount of resources. Additionally, resource usage optimization processes may be associated with different constraints, challenges and performance issues.

SUMMARY

A first aspect of the invention provides a hardware and software resource optimization method comprising: retrieving from a plurality of hardware and software systems, by a processor of a hardware controller, operational parameters of the plurality of hardware and software systems; analyzing, by the processor, the operational parameters; determining, by the processor based on results of the analyzing, a probability of impact with respect to modified sizing requirements associated with the hardware and software systems; generating, by the processor based on the results of the analyzing, actions comprising logical rules mapped to the operational parameters; executing, by the processor, the actions; determining, by the processor based on results of the execution, an actual impact with respect to executing the modified sizing requirements associated with the hardware and software systems; and modifying, by the processor in response to results of the executing and the determining the actual impact, operational allocations of the plurality of hardware and software systems with respect to operational functionality of the plurality of hardware and software systems.

A second aspect of the invention provides a computer program product, comprising a computer readable hardware storage device storing a computer readable program code, the computer readable program code comprising an algorithm that when executed by a processor of a hardware controller implements a hardware and software resource optimization method, the method comprising: retrieving from a plurality of hardware and software systems, by the processor, operational parameters of the plurality of hardware and software systems; analyzing, by the processor, the operational parameters; determining, by the processor based on results of the analyzing, a probability of impact with respect to modified sizing requirements associated with the hardware and software systems; generating, by the processor based on the results of the analyzing, actions comprising logical rules mapped to the operational parameters; executing, by the processor, the actions; determining, by the processor based on results of the execution, an actual impact with respect to executing the modified sizing requirements associated with the hardware and software systems; and modifying, by the processor in response to results of the executing and the determining the actual impact, operational allocations of the plurality of hardware and software systems with respect to operational functionality of the plurality of hardware and software systems.

A third aspect of the invention provides a hardware controller comprising a processor coupled to a computer-readable memory unit, the memory unit comprising instructions that when executed by the computer processor implements a hardware and software resource optimization method comprising: retrieving from a plurality of hardware and software systems, by the processor, operational parameters of the plurality of hardware and software systems; analyzing, by the processor, the operational parameters; determining, by the processor based on results of the analyzing, a probability of impact with respect to modified sizing requirements associated with the hardware and software systems; generating, by the processor based on the results of the analyzing, actions comprising logical rules mapped to the operational parameters; executing, by the processor, the actions; determining, by the processor based on results of the execution, an actual impact with respect to executing the modified sizing requirements associated with the hardware and software systems; and modifying, by the processor in response to results of the executing and the determining the actual impact, operational allocations of the plurality of hardware and software systems with respect to operational functionality of the plurality of hardware and software systems.

The present invention advantageously provides a simple method and associated system capable of implementing a resource usage optimization processes for hardware and software execution.

DETAILED DESCRIPTION

Figure 1:
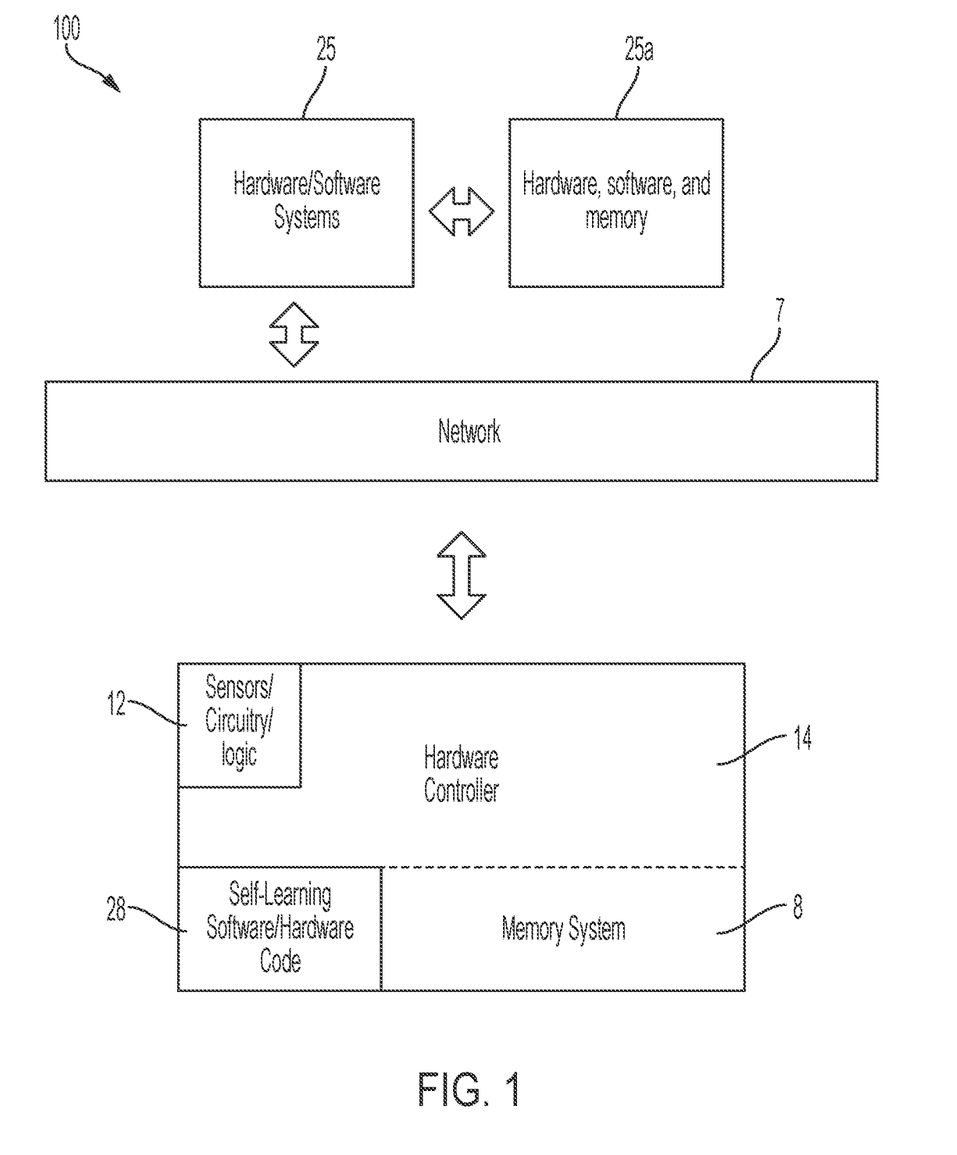
FIG. 1 illustrates a system for improving hardware and software technology associated with analyzing operational parameters of hardware and software systems for operational allocation modification, in accordance with embodiments of the present invention.

FIG. 1 illustrates a system 100 for improving hardware and software technology associated with analyzing operational parameters of hardware and software systems 25 for modifying operational allocation of the hardware and software systems 25, in accordance with embodiments of the present invention. Client systems are typically configured to generate and migrate workloads to a multi-cloud environment. Likewise, sizing processes (associated with workload systems) may struggle to determine attributes to be provided for management environments comprising hosted workloads. Differing constraints, challenges, security, and performance attributes may be implemented for enabling a client to achieve a best optimal sizing approach (in multi-cloud environment) associated with continued changing requirements aligned based on technical aspects. Key objectives may be generated for ensuring improved performance, utilization, and dynamic sizing for enabling technical objectives. Likewise, specified technical objectives typically require translation into technical requirements for managing sizing changes required. Therefore, system 100 enables a process for providing dynamic and continued sizing functionality associated with hardware and software resources based on workloads by executing cognitive continued sizing algorithm code within a multi-cloud environment.

System 100 comprises hardware/software modules for executing a hardware and software resource optimization process that includes:
1. Capturing inputs (e.g., a series of functions, requirements, constraints, and environmental conditions) from different sources (e.g., on-premise cloud, public cloud, etc.) associated with parameters such as, inter alia, virtual (v) CPU parameters, vMem parameters, storage parameters, serverless parameters, status parameters, integration parameters, network parameters, security parameters, differing cloud environment parameters, etc.
2. Analyzing differing input attributes and determining various actions (via smart logic and intelligent engine execution) by determining a set of differing logical mapping rules (e.g., associated with usage, data, transaction, route, activities, input, output, hand-shake, and predictive construct) for mapping different attributes with the logical mapping rules.
3. Utilizing each mapping rule to specify information indicative of changing resource allocations for a service or component of a service associated with the mapping rules. A change in resource allocations may include, inter alia, an increase or reduction of vCPU for optimization, a change of vMem with respect to utilization, an allocation of required storage, a usage of container serverless, a status check, an integration or change required, network construct and redefine routes, a specific cloud environment re-design, etc.
4. Converting technical requirement changes for translating a sizing requirement for specific smart technical logic to ensure that the technical requirements with respect to a transformation to technical construct logic. Additionally, hardware and software resources are deployed within a multi-cloud environment associated with dynamic requirement changes. Continued sizing requirements may be generated for every poll (e.g., a 5 second poll) with respect to: generating a change in transactions impacting the sizing requirements, detecting abnormality and required sizing changes; a disposition of hardware components requiring changes, and unknown changes impacting a sizing change. Alternatively, there may be some instances where the continued sizing requirements are generated for every poll.
5. Usage of continued sizing algorithm code associated with: a probability formula, Bayes' Theorem, criteria definition, and continued change management to determine a probability for determining sizing requirements and changes needed for each workload and pattern component.

System 100 of FIG. 1 includes a hardware controller 14 and hardware/software systems 25 interconnected through a network 7. Hardware controller 14 comprises sensors/circuitry/logic 12 and a (specifically defined) memory system 8. Memory system 8 comprises software code/engines 28 including executable code. Memory system 8 may include a single memory system. Alternatively, memory system 8 may include a plurality of memory systems. Hardware controller 14 and hardware/software systems 25 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware controller 14 and hardware/software systems 25 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry (e.g., sensors/circuitry/logic 12, etc.) may include proprietary specially designed components (e.g., a specialized integrated circuit, such as for example an Application Specific Integrated Circuit (ASIC) designed for only implementing an automated process for analyzing operational parameters of hardware and software systems 25 for modifying operational allocation of the hardware and software systems 25. Allocation of the hardware/software systems 25 may include allocating hardware, software, and memory 25a (of hardware/software systems 25) to alternative systems for executing operational functions performed by hardware/software systems 25. Sensors/circuitry/logic 12 may include any type of internal or external sensors including, inter alia, Global Positioning Sensor (GPS) sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 executes cognitive multi-cloud sizing algorithm code with respect to specified attributes associated with mapping rules specifying differing attributes requiring a match. Each mapping rule specifies information associated with allocate resource change allocations for a service or component with respect to a mapping rule within a new multi-cloud environment. A conversion of technical requirement changes may be converted to specific smart technical logic to ensure that requirements are enabled within a multi-cloud environment. Likewise, a probability to determine sizing requirements and changes necessary for each workload may be determined via execution of a probability formula and Bayes' theorem.

Figure 2:
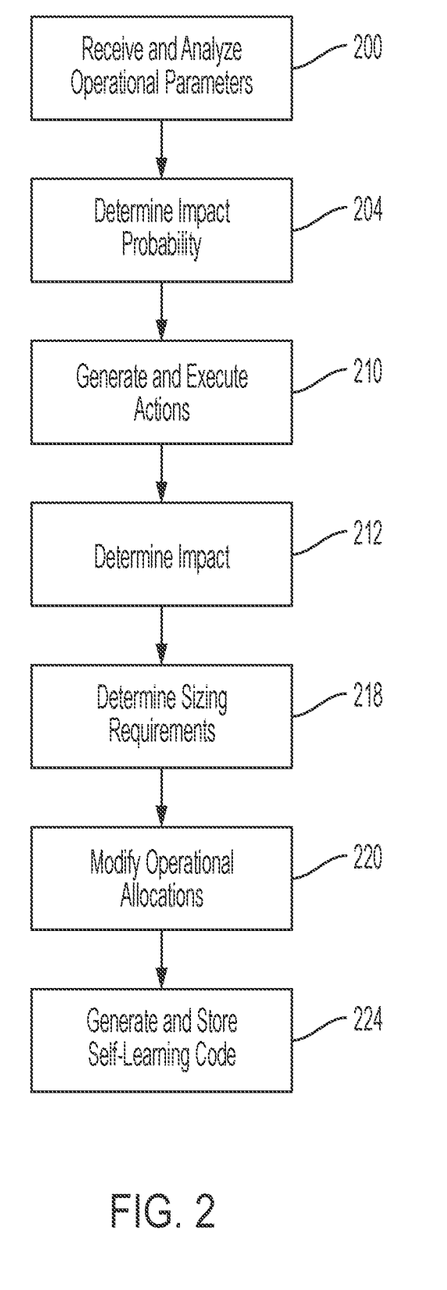
FIG. 2 illustrates an algorithm detailing a process flow enabled by the system of FIG. 1 for improving hardware and software technology associated with analyzing operational parameters of hardware and software systems for operational allocation modification, in accordance with embodiments of the present invention.

FIG. 2 illustrates an algorithm detailing a process flow enabled by system 100 of FIG. 1 for improving hardware and software technology associated with analyzing operational parameters of hardware and software systems for modifying operational allocation of the hardware and software systems, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by hardware controller 14 and hardware/software systems 25 of FIG. 1. In step 200, operational parameters of hardware and software systems are retrieved and analyzed. The hardware and software systems may be associated with a multi-cloud environment. The operational parameters may include, inter alia, virtual CPU parameters, virtual memory parameters, hardware memory parameters, serverless parameters, operational status parameters, component integration parameters, network parameters, security parameters, cloud environment parameters, etc.

In step 204, a probability of impact with respect to modified sizing requirements associated with the hardware and software systems is determined based on results of the analyses of step 200. In step 210, actions comprising logical rules mapped to the operational parameters are generated and executed based on results of the analyses of step 200. The logical rules may include, inter alia, usage rules, data processing rules, transaction rules, activity rules, input/output rules, hand shake rules, attribute mapping rules, etc.

In step 212, an actual impact with respect to executing the modified sizing requirements (associated with the hardware and software systems) is determined based on executing the actions of step 210. In step 218, sizing requirements and changes needed for the hardware and software systems are determined. In step 220, operational allocations of the hardware and software systems are modified with respect to an operational functionality of the hardware and software systems. Modifying the operational allocations may include migrating the operational allocations to additional hardware and software systems. Alternatively, modifying the operational allocations may include resizing memory allocations of the hardware and software systems. The modified operational allocations may include an increase or reduction of virtual CPU functionality for optimization, a modification of virtual memory according to utilization, an allocation of required storage, container serverless hardware usage, a status verification, integration or change required determination, a network construct, a redesign of a specific cloud environment, etc.

In step 224, self-learning software code for executing future processes associated with executing a hardware and software resource optimization method is generated and stored within a modified portion of a memory structure of the hardware controller.

Figure 3:
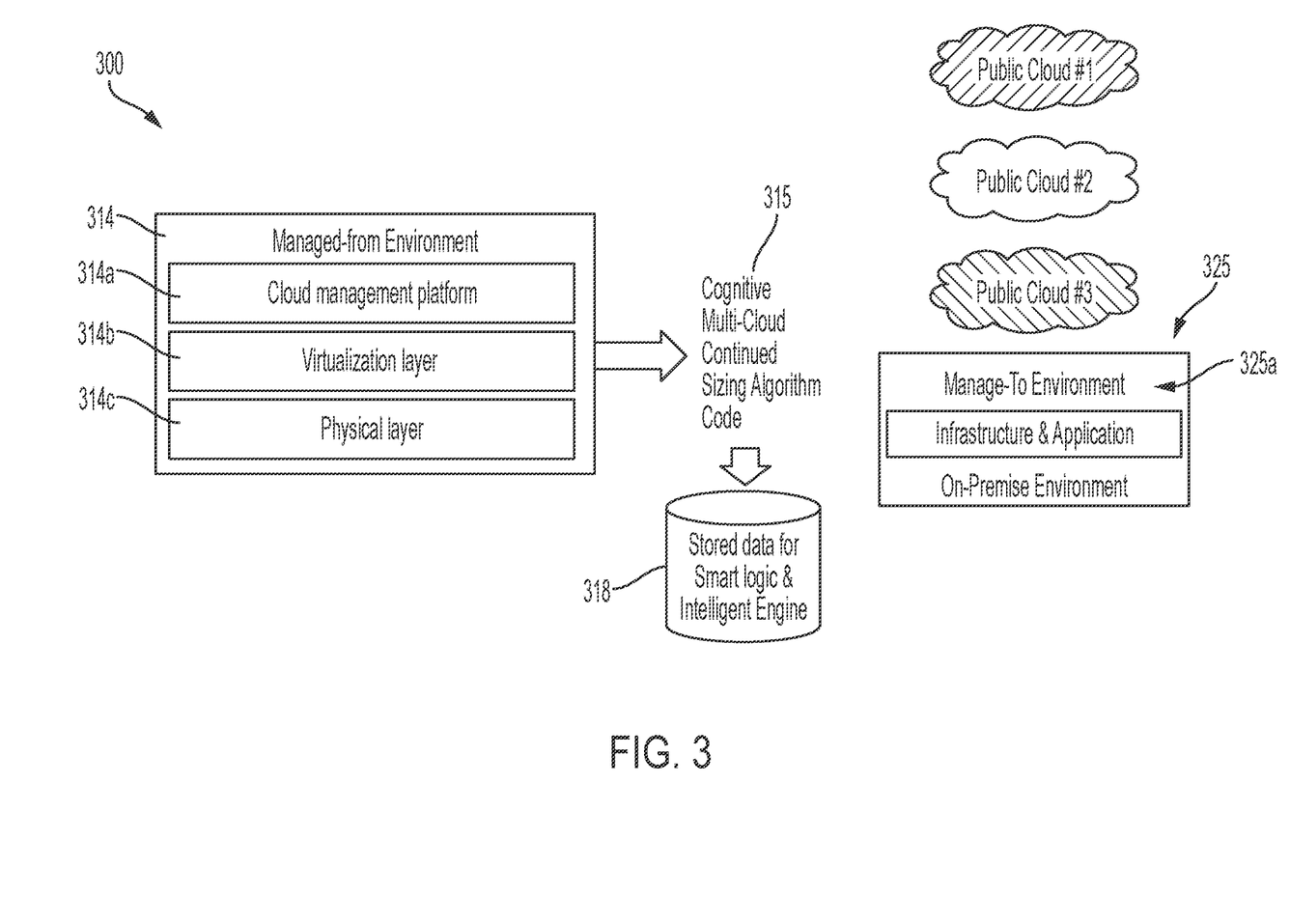
FIG. 3 illustrates a detailed view of a manage from environment and a manage to environment, in accordance with embodiments of the present invention.

FIG. 3 illustrates a detailed view 300 of a manage from environment 314 and a manage to environment 325, in accordance with embodiments of the present invention. The manage from environment 314 (associated with hardware controller of FIG. 1) includes a cloud management platform 314a, a virtualization layer 314b, and physical layer 314c. The manage from environment 314 is connected to a deployment server 315 configured to store and execute cognitive multi-cloud continued sizing code within a database 318. Database 318 is configured to store data for input to smart logic and an intelligent engine for deriving and modifying continued sizing of components in multi-cloud environment. The manage from environment 314 is enabled for managing, operating, and controlling the manage to environment 325. The manage to environment 325 comprises infrastructure and applications 325a residing on premise within a cloud or non-cloud environment (e.g., a data center).

Figure 4:
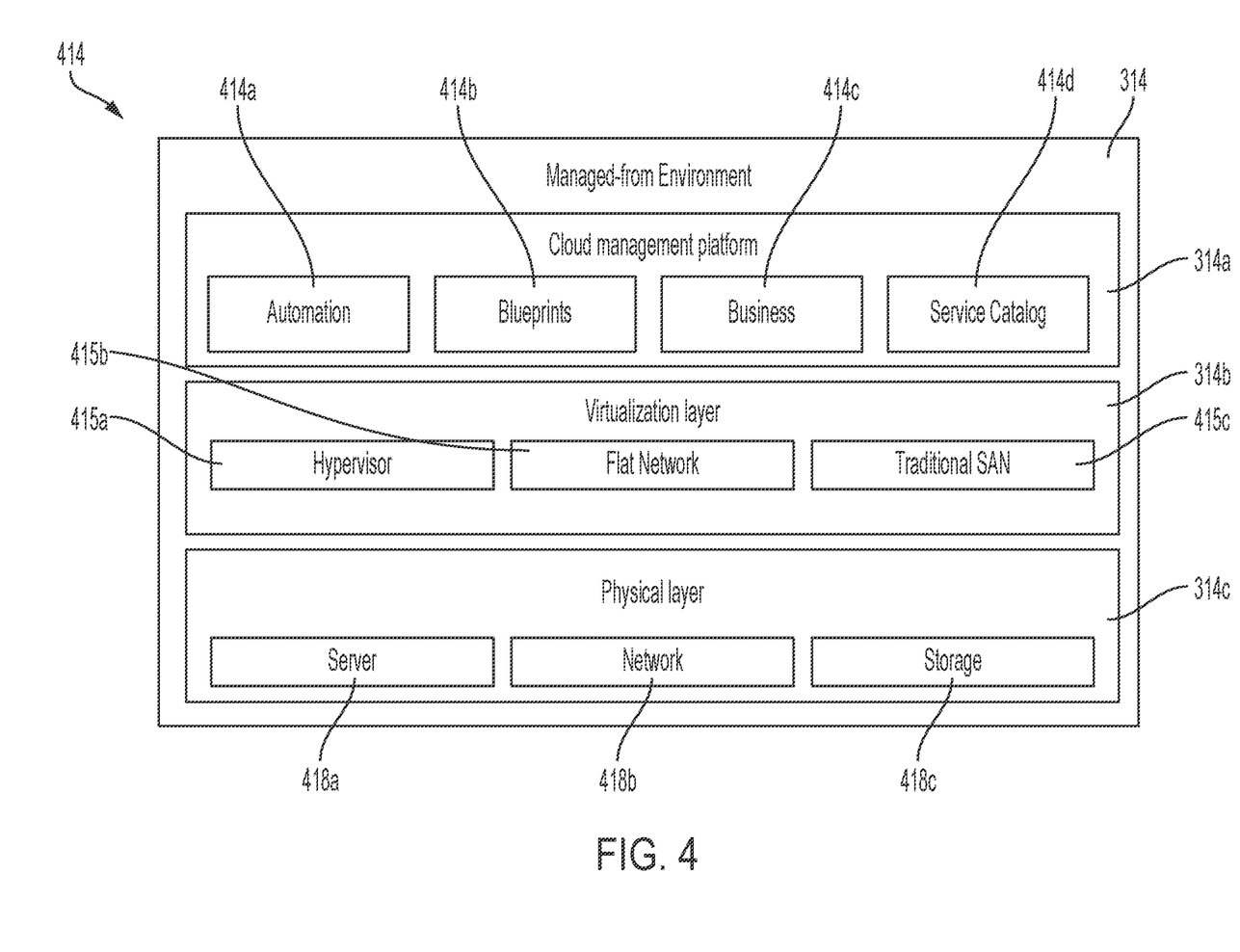
FIG. 4 illustrates an internal view of the manage from environment of FIG. 3, in accordance with embodiments of the present invention.

FIG. 4 illustrates an internal view 414 of manage from environment 314 of FIG. 3, in accordance with embodiments of the present invention. Cloud management platform 314a comprises modules 414a . . . 414d for: enabling automation of a multi-cloud environment, defining an associated blueprint, and enabling technical rules and a pre-defined service catalogue. Virtualization layer 314b includes a hypervisor 415a, a flat network storage area network 415b (for storing information for management of a multi-cloud), and a storage area network (SAN) 415c. Physical layer 314c comprises a server 418a, a network 418b, and storage 418c enabled for management of the multi-cloud environment.

Figure 5:
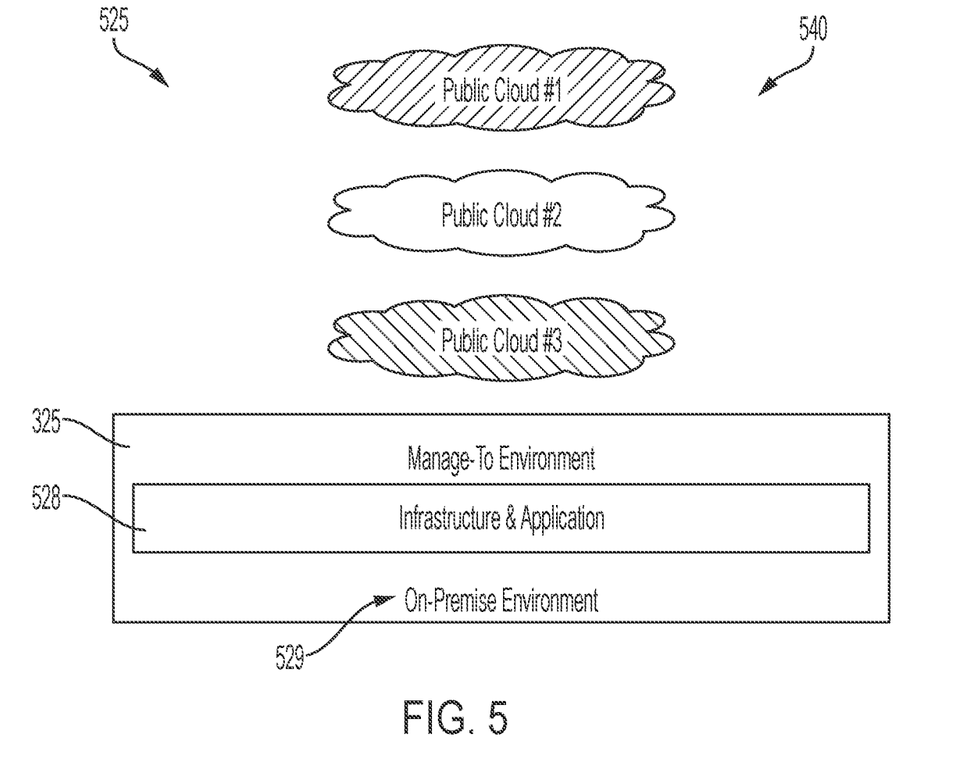
FIG. 5 illustrates an internal view of the manage to environment of FIG. 3, in accordance with embodiments of the present invention.

FIG. 5 illustrates an internal view 525 of manage to environment 325 of FIG. 3, in accordance with embodiments of the present invention. Manage to environment 325 comprises an infrastructure and application component 528 and an on-premise environment component 529 hosted within multi-cloud environment 540. Multi-cloud environment includes a public cloud, a private cloud, and multiple cloud providers comprising a different capacity and sizing of individual components. For example, a vCPU provided by a first company and vCPU provided by a second company may be associated with differing capacities and may require differing vCPU sizing for deployment within a continued resizing of a multi-cloud environment.

Figure 6:
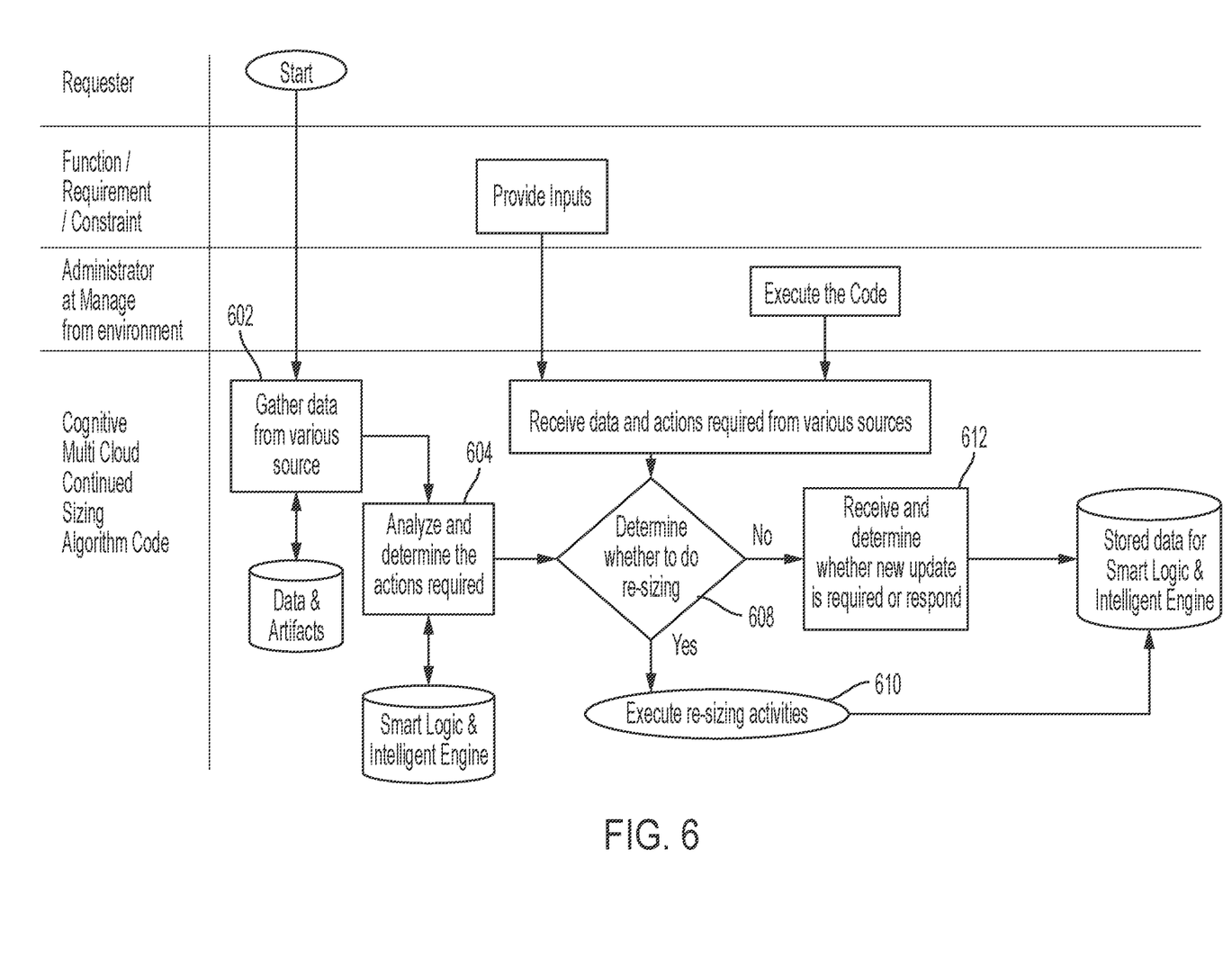
FIG. 6 illustrates an algorithm detailing a process flow of for implementing a multi-cloud continued sizing construct process, in accordance with embodiments of the present invention.

FIG. 6 illustrates an algorithm detailing a process flow of for implementing a multi-cloud continued sizing construct, in accordance with embodiments of the present invention. For example, a requester (such as a system administrator) may initiate system modifications based on requirements (from users/clients and data associated with a related function, requirement, and constraint) inputted into the system. Alternatively, system modifications may be automatically initiated based on attributes such as, inter alia, detected or determined requirements from users/clients and associated data. The data may be received from various sources in step 602. The received data is analyzed (in step 604) for determining required actions. The analysis may include executing a probability formula code, Bayes' theorem code, operation rules mapping code, continued change management code, and annotation decision engine code with respect to the data. An output from the analysis is used to determine if a continued system re-sizing is necessary. If in step 608 it is determined that a continued system re-sizing is necessary, then in step 610, re-sizing code is triggered, and smart logic and an intelligent engine database are updated. If in step 608 it is determined that a continued system re-sizing is not necessary, then in step 612, pre-defined criteria is reviewed, and it is determined if an update of the smart logic and intelligent engine database is required.

Figure 7:
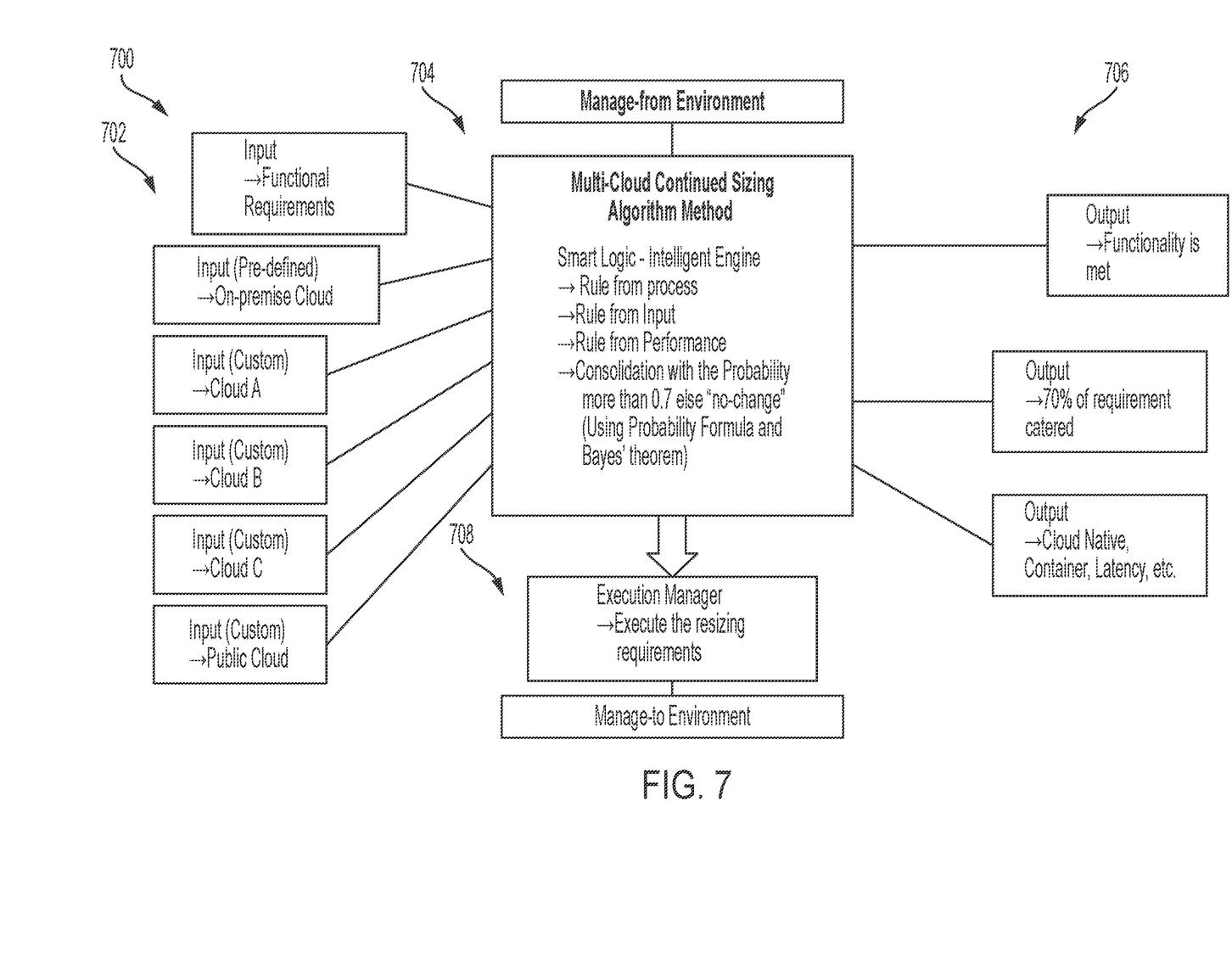
FIG. 7 illustrates a system comprising an input component, a mapping component, an output component, and a sizing component, in accordance with embodiments of the present invention.

FIG. 7 illustrates a system 700 comprising an input component 702, a mapping component 704, an output component 706, and a sizing component (i.e., an execution manager) 708, in accordance with embodiments of the present invention. System 700 executes a multi-cloud continued sizing construct algorithm associated with system sizing requirements. Input component 702 comprises multiple sources including, an on-premise cloud and additional public cloud inputs enabled for providing input into a multi-cloud continued sizing module. The multiple sources are associated with hardware/software parameters such as, inter alia, vCPU, vMem, storage, serverless, status, integration, network, security, etc. Mapping component 704 comprises code for executing logical mapping rules associated with the following system attributes: usage, data, transaction, route, activities, input, output, hand-shake, predictive construct, etc. Output component 706 enables the following actions: an increase or reduction of vCPU for optimization, a change of vMem according to utilization, an allocation of required storage, a determined use of a container, a check on a system status, a change required, a network construct, and a specific cloud environment re-design.

Sizing component 708 generates at least one of the following output functionality:

1. A poll executed during specified intervals (e.g., every 5 seconds).
2. A change in transactions.
3. A change in a process impacting sizing requirements.
4. Detecting an abnormality related to a sizing change.
5. Disposition of hardware components requiring changes.
6. Unknown changes impacting a sizing change The multi-cloud continued sizing module is configured to determine continued system sizing requirements via execution of at least one of the following processes: a probability formula implemented process, a Bayes' theorem implemented process, a criteria definition implemented process, a continued change management implemented process, and an annotation decision engine implemented process.

A probability formula implemented process is associated with a probability that a binomial experiment results in x successes or + or −x successes. A binomial probability formula is executed as follows: P(r success in n trials)=nCr pr qn−r, where:

p=a probability of success
q=a probability of failure (or complement of the event)
n=a total number of trials
r=a number of specific events we want to obtain
nCr represents a selection of r events from n and may be written as: nCr=n!r!(n−r)!

A Bayes' theorem implemented process is enabled to determine a probability of an outcome given the value of a specified variable. For example, determining a probability of a hypothesis (h) being true, given prior knowledge (d) as follows:

$$P(h|d)=(P(d|h)*P(h))/P(d) \text{ where:}$$

P(h|d)=Posterior probability. The probability of hypothesis h being true, given the data d, where P(h|d)=P(d1|h)*P(d2|h)* . . . *P(dn|h)*P(d)

P(d|h)=Likelihood. The probability of data d given that the hypothesis h was true.

P(h)=Class prior probability. The probability of hypothesis h being true (irrespective of the data)

P(d)=Predictor prior probability. Probability of the data (irrespective of the hypothesis)

A criteria definition implemented process is executed based on an annotation of rules defined and managed via a smart logic intelligent engine database where rules of a technical process, input, and performance are being captured to ensure criteria is being met before a re-sizing process is implemented.

Continued change management implemented process is associated with pre-defined control points to ensure changes are executed automatically via a manage-from environment after all the rules are met and approval is received via change management rules defined in the multi-cloud environment.

An annotation decision engine implemented process generates a consolidated outcome (derived from analysis) captured and run through a criteria definition tool to determine a final output based on continued change management.

The following implementation example describes a process associated with an institution requiring a need for adding workloads for a new product roll out such that a number of estimated transactions may not be accurate. Therefore, due to marketing activities during the roll-out, a system capacity allocated is not able to support the sudden increase in transactions. The process is initiated when an annotation decision engine receives and consolidates the outputs from system 700 in accordance with the following processes:

A resizing determination process for determining that a probability outcome derived determines that a re-sizing is required to ensure that the system is able to continue to support an increase in unexpected transactions during the roll out.

A rule execution process for determining that additional workloads required are resized such that any detected deviation less than a predetermined percentage (e.g., less than 100%) enables an existing baseline to be executed accordingly.

An annotator engine decision process is executed if a deviation is less than a predetermined percentage (e.g., less than 100%) of an existing baseline for the initial roll out.

An outcome generated via the annotator engine is enabled to finalize the outcome and trigger the execution manager to increase the vCPU, vMem, and add another gateway, to ensure the additional transactions are managed accordingly. Subsequently, the execution manager executes the steps (via code) required to re-size the manage-to environment such that it may continue to support the additional transactions generated during the roll out.

Figure 8:
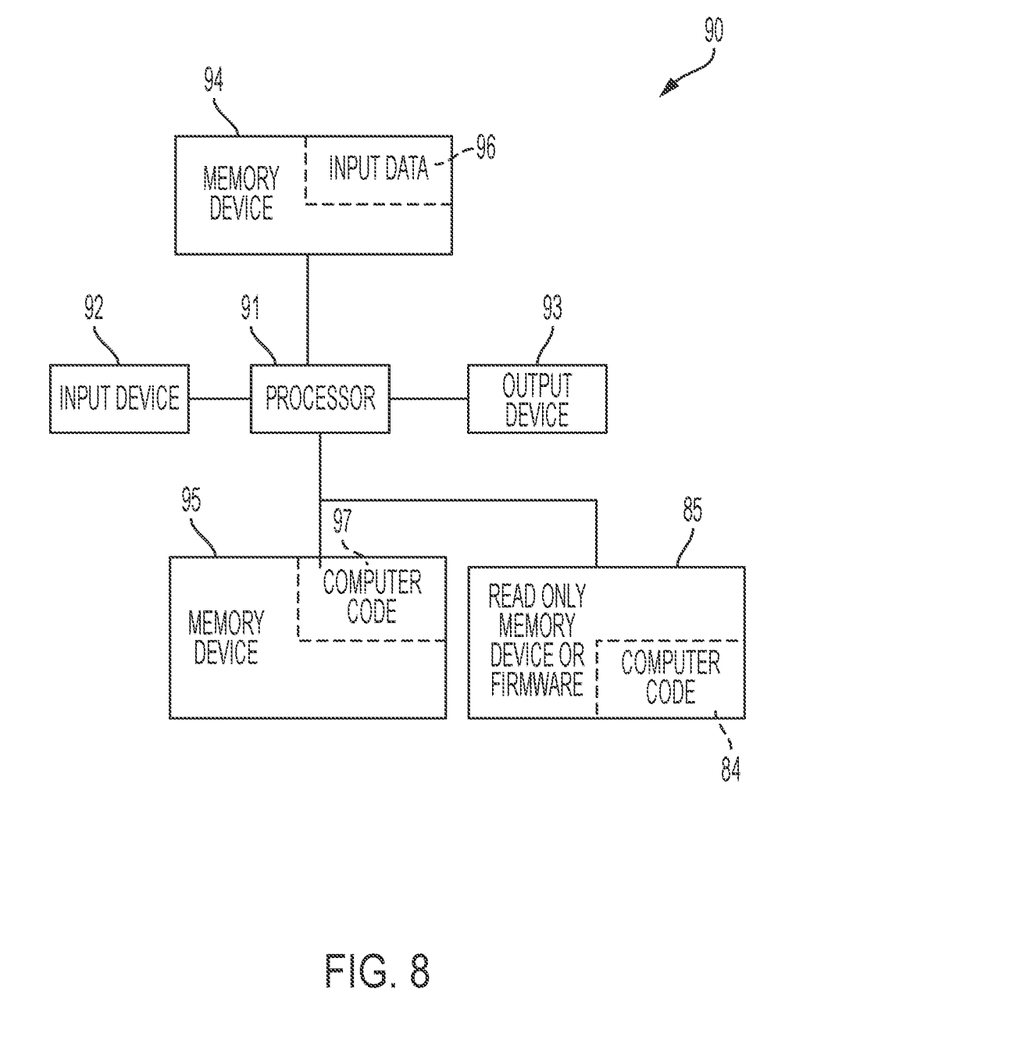
FIG. 8 illustrates a computer system used by or comprised by the system of FIG. 1 for improving hardware and software technology associated with analyzing operational parameters of hardware and software systems for opera

FIG. 8 illustrates a computer system 90 (e.g., hardware controller 14 and hardware/software systems 25 of FIG. 1) used by or comprised by the system 100 of FIG. 1 for improving hardware and software technology associated with analyzing operational parameters of hardware and software systems for operational allocation modification, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 8 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving hardware and software technology associated with analyzing operational parameters of hardware and software systems for operational allocation modification. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve hardware and software technology associated with analyzing operational parameters of hardware and software systems for operational allocation modification. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving hardware and software technology associated with analyzing operational parameters of hardware and software systems for operational allocation modification. In another embodiment, the invention provides a business method that performs the process steps of the invention on a subscription, advertising, and/or fee basis. That is, a service supplier, such as a Solution Integrator, could offer to enable a process for improving hardware and software technology associated with analyzing operational parameters of hardware and software systems for operational allocation modification. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
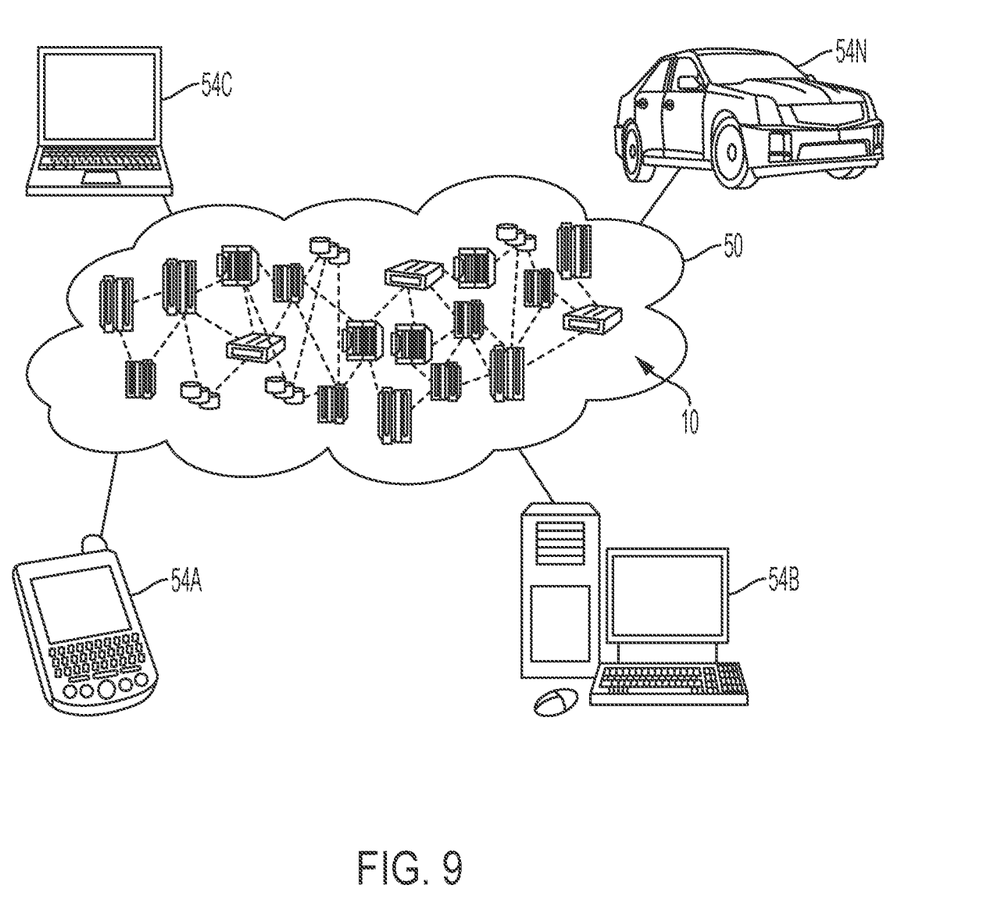
- FIG. 9 illustrates a cloud computing environment, in accordance with embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 10:
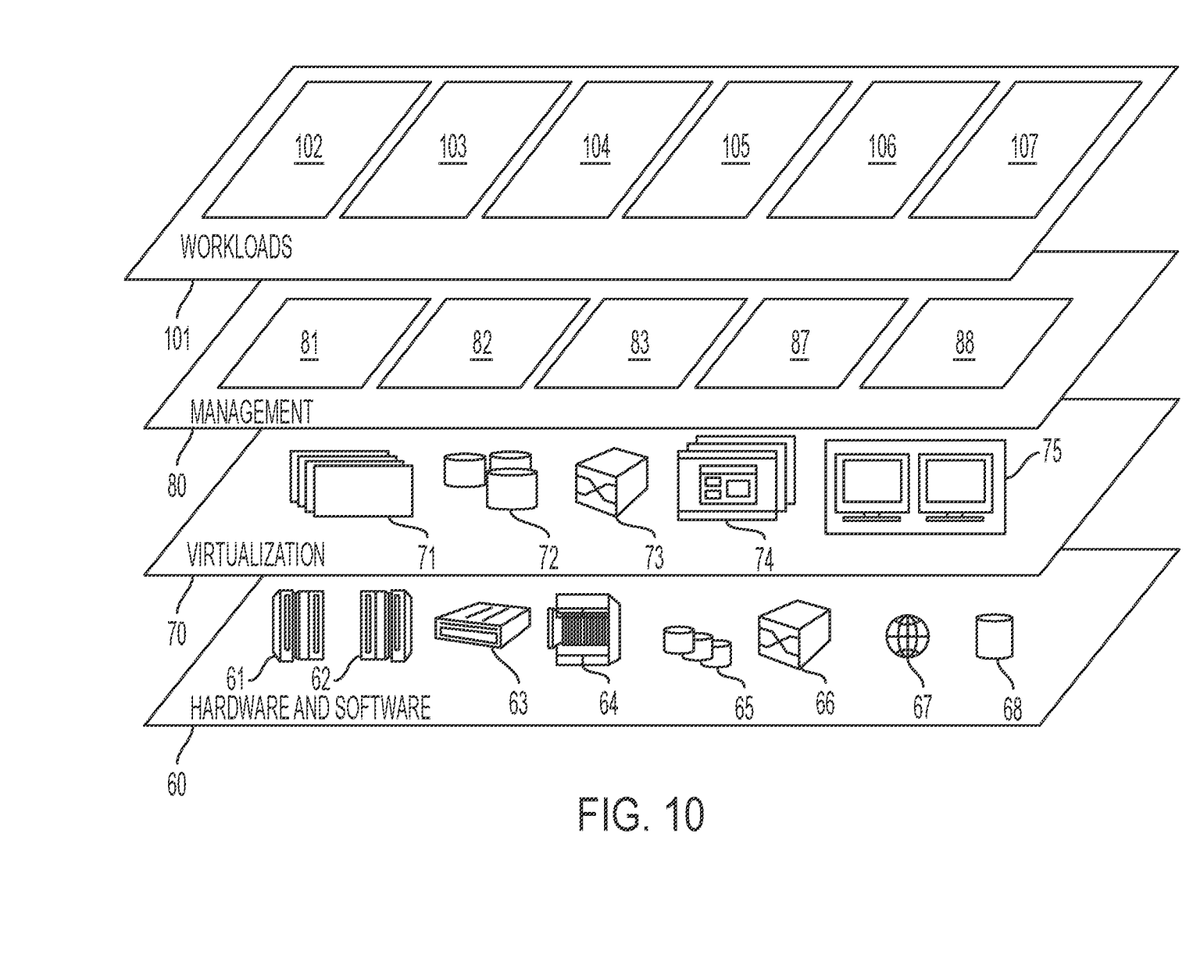
FIG. 10 illustrates a set of functional abstraction layers provided by cloud computing environment, in accordance with embodiments of the present invention.

Referring now to FIG. 10, a set of functional abstraction layers provided by cloud computing environment 50 (see FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving hardware and software technology associated with analyzing operational parameters of hardware and software systems for operational allocation modification 108.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A hardware and software resource optimization method comprising:
    retrieving from hardware and software systems, by a processor of a hardware controller, operational parameters of said hardware and software systems;
    analyzing, by said processor, said operational parameters;
    determining, by said processor based on results of said analyzing, a probability of impact with respect to modified sizing requirements associated with said hardware and software systems;
    generating, by said processor based on said results of said analyzing, actions comprising logical rules mapped to said operational parameters;
    executing, by said processor, said actions;
    determining, by said processor based on results of said execution, an actual impact with respect to executing said modified sizing requirements associated with said hardware and software systems; and
    modifying, by said processor in response to results of said executing and said determining said actual impact, operational allocations of said hardware and software systems with respect to operational functionality of said hardware and software systems.

2. The method of claim 1, wherein said operational parameters comprise hardware and software based parameters selected from the group consisting of virtual CPU parameters, virtual memory parameters, hardware memory parameters, serverless parameters, operational status parameters, component integration parameters, network parameters, security parameters, and cloud environment parameters.

3. The method of claim 1, wherein said logical rules comprise rules selected from the group consisting of usage rules, data processing rules, transaction rules, activity rules, input/output rules, hand shake rules, and attribute mapping rules.

4. The method of claim 1, wherein said modified operational allocations comprise allocation changes selected from the group consisting of an increase or reduction of virtual CPU functionality for optimization, a modification of virtual memory according to utilization, an allocation of required storage, container serverless hardware usage, a status verification, integration or change required determination, a network construct and routes redefine, and a redesign of a specific cloud environment.

5. The method of claim 1, wherein said modifying comprises migrating said operation allocations of said hardware and software systems to an additional plurality of hardware and software systems.

6. The method of claim 1, further comprising:
determining, by said processor, sizing requirements and changes needed for said hardware and software systems, wherein said modifying is further in response to results of said determining.

7. The method of claim 6, wherein said modifying comprises resizing memory allocations of said hardware and software systems.

8. The method of claim 1, further comprising:
generating, by said processor, self learning software code for executing future processes associated with executing said hardware and software resource optimization method; and
storing, by said processor, said self learning software code within a modified portion of a memory structure of said hardware controller.

9. The method of claim 1, wherein said hardware and software systems are associated with a multi-cloud environment.

10. The method of claim 1, further comprising:
providing at least one support service for at least one of creating, integrating, hosting, maintaining, and deploying computer-readable code in the control hardware, said code being executed by the computer processor to implement: said retrieving, said analyzing, said determining said probability of impact, said generating said executing, said determining said actual impact, and said modifying.

11. A computer program product, comprising a computer readable hardware storage device storing a computer readable program code, said computer readable program code comprising an algorithm that when executed by a processor of a hardware controller implements a hardware and software resource optimization method, said method comprising:
retrieving from hardware and software systems, by a processor of a hardware controller, operational parameters of said hardware and software systems;
analyzing, by said processor, said operational parameters;
determining, by said processor based on results of said analyzing, a probability of impact with respect to modified sizing requirements associated with said hardware and software systems;
generating, by said processor based on said results of said analyzing, actions comprising logical rules mapped to said operational parameters;
executing, by said processor, said actions;
determining, by said processor based on results of said execution, an actual impact with respect to executing said modified sizing requirements associated with said hardware and software systems; and
modifying, by said processor in response to results of said executing and said determining said actual impact, operational allocations of said hardware and software systems with respect to operational functionality of said hardware and software systems.

12. The computer program product of claim 11, wherein said operational parameters comprise hardware and software-based parameters selected from the group consisting of virtual CPU parameters, virtual memory parameters, hardware memory parameters, serverless parameters, operational status parameters, component integration parameters, network parameters, security parameters, and cloud environment parameters.

13. The computer program product of claim 11, wherein said logical rules comprise rules selected from the group consisting of usage rules, data processing rules, transaction rules, activity rules, input/output rules, hand shake rules, and attribute mapping rules.

14. The computer program product of claim 11, wherein said modified operational allocations comprise allocation changes selected from the group consisting of an increase or reduction of virtual CPU functionality for optimization, a modification of virtual memory according to utilization, an allocation of required storage, container serverless hardware usage, a status verification, integration or change required determination, a network construct and routes redefine, and a redesign of a specific cloud environment.

15. The computer program product of claim 11, wherein said modifying comprises migrating said operation allocations of said hardware and software systems to an additional plurality of hardware and software systems.

16. The computer program product of claim 11, wherein said method further comprises:
determining, by said processor, sizing requirements and changes needed for said hardware and software systems, wherein said modifying is further in response to results of said determining.

17. The computer program product of claim 11, wherein said modifying comprises resizing memory allocations of said hardware and software systems.

18. The computer program product of claim 11, wherein said method further comprises:
generating, by said processor, self learning software code for executing future processes associated with executing said hardware and software resource optimization method; and
storing, by said processor, said self learning software code within a modified portion of a memory structure of said hardware controller.

19. The computer program product of claim 11, wherein said hardware and software systems are associated with a multi-cloud environment.

20. A hardware controller comprising a processor coupled to a computer-readable memory unit, said memory unit comprising instructions that when executed by the computer processor implements a hardware and software resource optimization method comprising:
retrieving from hardware and software systems, by a processor of a hardware controller, operational parameters of said hardware and software systems;
analyzing, by said processor, said operational parameters;

determining, by said processor based on results of said analyzing, a probability of impact with respect to modified sizing requirements associated with said hardware and software systems;

generating, by said processor based on said results of said analyzing, actions comprising logical rules mapped to said operational parameters;

executing, by said processor, said actions;

determining, by said processor based on results of said execution, an actual impact with respect to executing said modified sizing requirements associated with said hardware and software systems; and modifying, by said processor in response to results of said executing and said determining said actual impact, operational allocations of said hardware and software systems with respect to operational functionality of said hardware and software systems.

* * * * *